United States Patent [19]

Upmeier et al.

[11] Patent Number: 4,682,941
[45] Date of Patent: Jul. 28, 1987

[54] FLATTENING AND TAKE-OFF APPARATUS FOR PROVIDING A PLASTIC FILM WEB FROM A BLOWN TUBULAR FILM

[75] Inventors: Hartmut Upmeier; Rudolf Peters, both of Lengerich, Fed. Rep. of Germany

[73] Assignee: Windmöller & Hölscher, Lengerich, Fed. Rep. of Germany

[21] Appl. No.: 872,574

[22] Filed: Jun. 10, 1986

[30] Foreign Application Priority Data

Jun. 11, 1985 [DE] Fed. Rep. of Germany ....... 3520914

[51] Int. Cl.⁴ ............................................. B29C 53/10
[52] U.S. Cl. ................................ 425/72 R; 264/209.3; 264/563; 425/302.1; 425/325
[58] Field of Search ................... 425/72 R, 326.1, 325, 425/387.1, 302.1, 328, 140, 150; 264/563, 564, 209.1, 209.3, 210.1, 40.1

[56] References Cited

U.S. PATENT DOCUMENTS

| | | | |
|---|---|---|---|
| 3,167,814 | 2/1965 | Corbett | 425/72 R |
| 3,355,770 | 12/1967 | Augustin | 425/326.1 |
| 3,436,442 | 4/1969 | Saks | 425/326.1 X |
| 3,472,924 | 10/1969 | Sederlund et al. | 264/563 X |
| 3,560,600 | 2/1971 | Gliniecki | 425/72 R X |
| 3,574,806 | 4/1971 | Potter et al. | 425/325 X |
| 3,784,347 | 1/1974 | Robinson | 425/326.1 X |
| 3,905,736 | 9/1975 | Bringman | 425/326.1 X |
| 4,127,371 | 11/1978 | Luthra | 425/72 R |
| 4,270,891 | 6/1981 | Hopper | 425/326.1 X |
| 4,533,309 | 8/1985 | Planeta | 425/387.1 X |

FOREIGN PATENT DOCUMENTS

| | | |
|---|---|---|
| 1799446 | 11/1958 | Fed. Rep. of Germany . |
| 2052127 | 4/1972 | Fed. Rep. of Germany . |
| 3324978 | 1/1985 | Fed. Rep. of Germany . |

*Primary Examiner*—Richard L. Chiesa
*Attorney, Agent, or Firm*—Fleit, Jacobson, Cohn & Price

[57] ABSTRACT

Flattening and take-off apparatus for use with a device for providing a blown tubular film. The apparatus includes a flattening device for flattening the tubular film, and a cutting device for cutting one lateral edge of the flattened film. A pair of pinch rollers is provided and is driven to carry the cut and flattened film to an unfolding device, which is defined by a pair of edges that are inclined relative to the direction of movement of the film web, and over which respective ones of the juxtaposed portions of the cut flattened web are adapted to pass to define a single ply web. The pinch rolls include removable spacing rings to prevent the formation of a fold line on the opposite lateral edge from the cut edge of the flattened film. The unfolding device is movable laterally and parallel to the direction of movement of the film.

11 Claims, 7 Drawing Figures

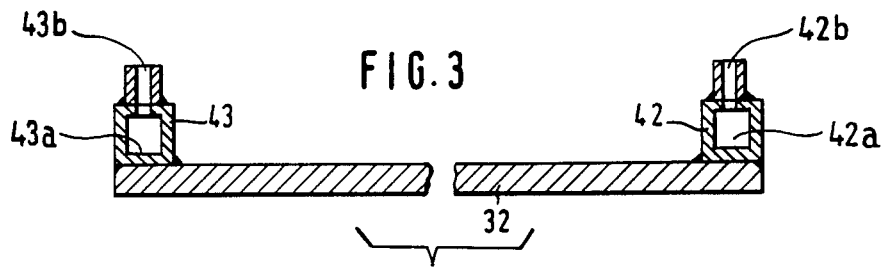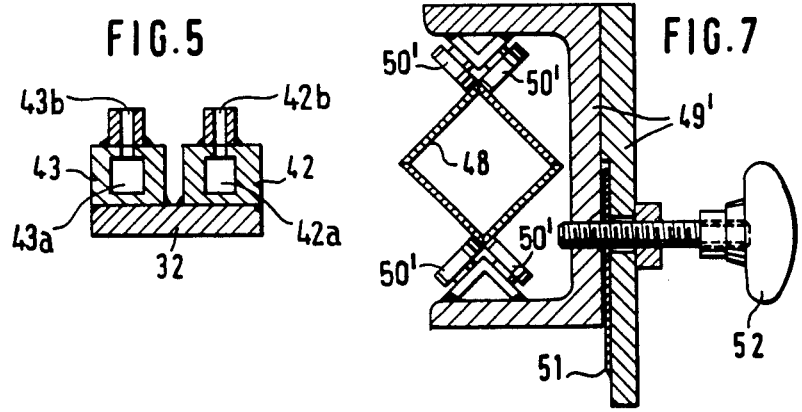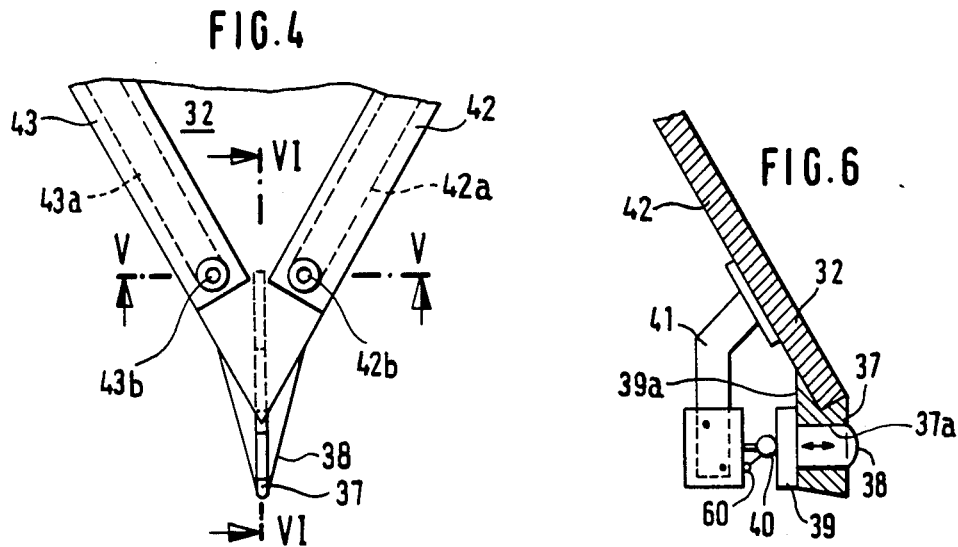

FLATTENING AND TAKE-OFF APPARATUS FOR PROVIDING A PLASTIC FILM WEB FROM A BLOWN TUBULAR FILM

BACKGROUND OF THE INVENTION

1. Field of the Invention

This invention relates to a flattening and take-off apparatus for processing a blown plastic film made by means of a stationary film-blowing head, and more particularly to a flattening and take-off apparatus including a cutter to slit the flattened tubular film along one longitudinal edge, and an unfolding device to turn portions of the cut tubular film to provide a single layer web.

2. Description of the Prior Art

Tubular film flattening and take-off apparatus is known from published German Application No. 33 24 978. In that known apparatus a cutting knife is disposed approximately in the axis of rotation of the apparatus, so that during a reciprocating operation of the apparatus one ply of the tubular film web will be centrally slit. The central slitting of one ply of the tubular film web can, however, have edges of the resulting unfolded film web that are not perfectly parallel to each other.

Further, apparatus disclosed in German Utility Model Specification No. 17 99 446 is used to make a film web from a flattened tubular film wherein the latter is slit at a fold line and is unfolded about the other fold line by a wedge-shaped unfolding device. However, the fold line about which the tubular film is unfolded remains visible in the film web and is undesirable. Further, the unfolding device disclosed in that publication cannot be used in a flattening and take-off apparatus used in conjunction with a tubular film blowing apparatus because the unfolding device cannot be adjusted to adapt to changing operating conditions.

It is an object of the present invention to provide an apparatus in which extruded and flattened tubular film webs can be slit and unfolded to form unfolded film webs that have substantially parallel side edges, and that do not exhibit pinch marks or fold line marks.

SUMMARY OF THE INVENTION

Briefly stated, in accordance with one aspect of the present invention, a flattening and take-off apparatus is provided for a tubular plastic film that is extruded from a stationary film-blowing head. The apparatus includes a flattening device positioned downstream of the film blowing head, the flattening device being adapted to flatten the tubular film after it is extruded. A pair of rotatable pinch rollers is positioned downstream of the flattening device, and the axes of the pinch rolls are arranged in parallel relationship for receiving flattened tubular film therebetween. A cutter is positioned between the pinch rollers and the flattening means for longitudinally cutting the flat film along one lateral edge to define a pair of juxtaposed film portions that are connected at an opposite lateral edge of the flattened tubular film. An unfolding device is positioned downstream of the pinch rollers for receiving the cut flattened film and for progressively turning each of the juxtaposed film portions in opposite directions about the opposite lateral uncut edge until the juxtaposed film portions are substantially coplanar, to provide a substantially flat, single thickness web. The unfolding device includes an edge member that is in contact with the opposite lateral edge of the film, and also includes outwardly diverging edge members about which respective ones of the juxtaposed film members are adapted to pass and be turned. The position of the unfolding device can be adjusted relative to the axis of the tubular film.

BRIEF DESCRIPTION OF THE DRAWINGS

FIG. 3 is a cross-sectional view taken on line III—III of FIG. 2.

FIG. 4 is a fragmentary, enlarged top view showing the lowermost portion of the unfolding device illustrated in FIGS. 1 and 2.

FIG. 5 is a cross-sectional view taken on line V—V of FIG. 4.

FIG. 6 is a cross-sectional view taken on line VI—VI of FIG. 4.

FIG. 7 is an enlarged cross-sectional view showing the cutting knife holder shown in FIGS. 1 and 2.

DESCRIPTION OF THE PREFERRED EMBODIMENTS

Figure 1:
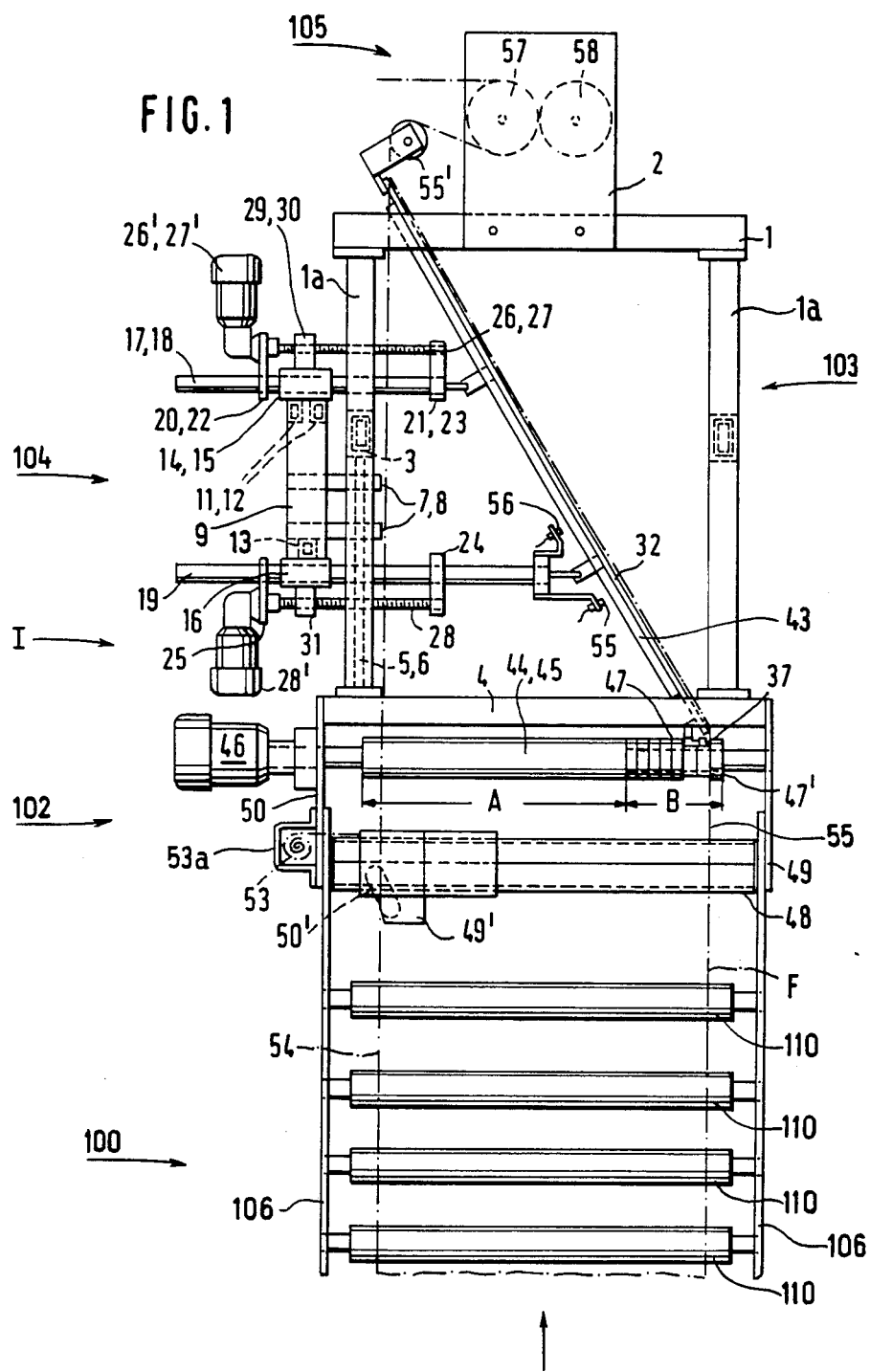
FIG. 1 is a side elevation showing flattening and take-off apparatus including an unfolding device in accordance with the present invention.
Figure 2:
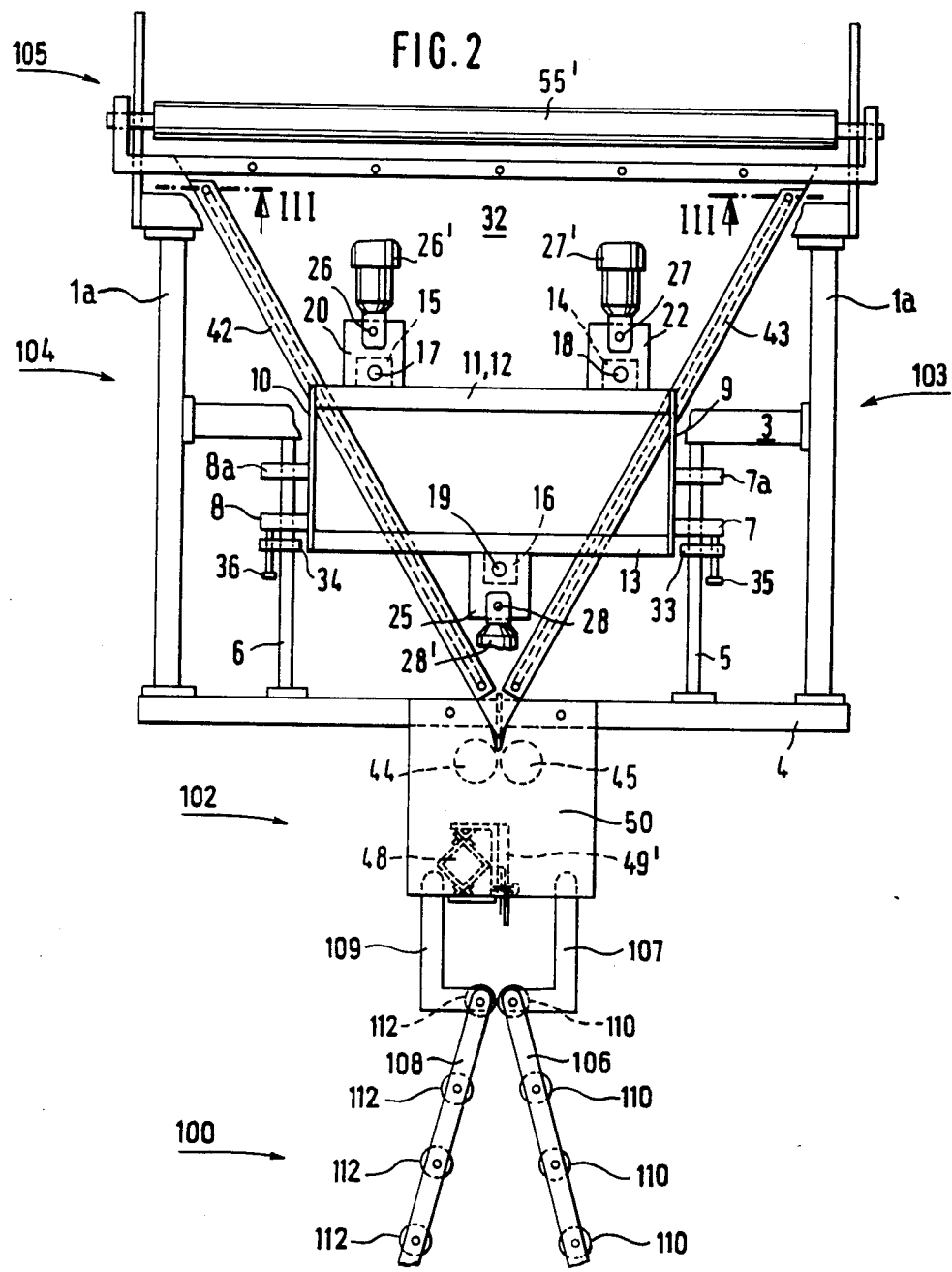
FIG. 2 is a front elevation showing the unfolding device of FIG. 1, as viewed in the direction of arrow I in FIG. 1.

Referring to the drawings, and particularly to FIGS. 1 and 2 thereof, there is shown in elevation a flattening and take-off apparatus in accordance with the present invention. The apparatus includes a tubular film flattening section 100, a cutting and pinching section 102, and an unfolding section 104. A take-off section 105 is positioned above and downstream of unfolding section 104.

Flattening section 100 is positioned downstream of an annular film extrusion head (not shown) for extruding a tubular film and is in substantial axial alignment with the extrusion head. Flattening section 100 includes a plurality of rollers 110 having their ends journalled for rotation in respective spaced parallel roller carriers 106. Similarly, rollers 112 have their ends rotatably journalled in spaced, parallel roller carriers 108. Each of the roller carriers includes an L-shaped extension 107 and 109, respectively, and the uppermost ends of each of L-shaped members 107 and 109 are secured to respective spaced end plates 49 and 50. As best seen in FIG. 2, the respective rollers 110 and 112 are so positioned that the spacing between the axes of pairs of opposed rollers diminishes in the direction of movement of the tubular film, so that the tube of film can be progessively flattened.

A supporting frame 103 for supporting an unfolding triangle 32 in unfolding section 104 is provided upstream of and is connected with end plates 49 and 50. Frame 103 includes a rectangular top frame 1 and a rectangular bottom frame 4, each of which extends laterally relative to the axis of the film, and spaced from each other along the axis of the film. A plurality of connecting beams 1a extend in a direction parallel to the film axis between and interconnect respective corners of top and bottom frames 1 and 4. Additionally, connected to and extending from top frame 1 is a carrying head 2 that supports the take-off section 105. The entire assembly of flattening section 100, cutting and pinching section 102, unfolding section 104, and take-off section 105 defines a unitary structure that is suitably supported for rotation through an angle of up to 360° about the axis of the tubular film by means of suitable rotation apparatus, such as that disclosed in published West German Application No. 20 52 127.

Cutting and pinching section 102 includes a pair of transversely spaced pinch rolls 44 and 45 that have their axes in parallel relationship and also substantially parallel with the axes of rollers 110 and 112. The pinch rolls are disposed above the flattening section 100, and at least one of the rolls 44, 45 is adapted to be driven by a motor 46 so that tension in the tubular film is minimized as it passes through the unfolding section 104, to thereby prevent the formation of tension wrinkles in the film. Each of pinch rolls 44 and 45 has one end portion that is of smaller diameter, and has an axial length that is identified by B in FIG. 1. The remainder of the axial length of each roll, designated A in FIG. 1, is of larger diameter. The width of the flattened film is designated as F, and depending upon the value of F, a number of removable spacing rings 47 can be provided on the reduced diameter portion B of each of pinch rolls 44 and 45 in such a manner that the outermost lateral edge of the flattened film F adjacent reduced diameter portion B will not contact the outer surfaces of pinch rolls 44 and 45 and will therefore not be creased. As a result, no lines or pinch marks will be apparent in the film when the cut tubular film is unfolded, as will hereinafter be described.

Positioned between pinch rolls 44 and 45 and supported in side plates 49 and 50 is a profiled, transversely extending guide 48, which, as shown, is of substantially square cross section. Referring now to FIG. 7, a knife holder 49' is movably supported on profiled guide 48 by means of a plurality of rollers 50' that engage with and roll on the outer surface of profiled guide 48. A knife blade 51 is held in and extends laterally outwardly of blade holder 49' and is secured in position in holder 49' by means of a clamp screw 52. As best seen in FIG. 1, knife holder 49' is connected to one end of a spiral spring 53 that is positioned within a spring housing 53a secured to support plate 50. The knife 51 is positioned to extend into the path of the axially moving flattened tubular film and to provide a longitudinal cut at the outermost edge 54 of the film.

Extending upwardly from bottom frame 4 between one pair of end columns 1a are a pair of columns 5, 6, that extend from bottom frame 4 to cross beam 3 and in a direction parallel to the film axis. A pair of guide members 7, 7a are slidably carried on column 5, and a corresponding pair of guide members 8, 8a are slidably carried on column 6. The respective guide members are spaced from each other along respective columns 5 and 6, and are, in turn, secured to respective end plates 9 and 10 that are parallel to each other. A pair of parallel upper beams 11, 12, and a lower beam 13 extend between and are secured to each of end plates 9 and 10. Stops 33 and 34 are provided on columns 5, and 6, respectively, and include adjusting screws 35, 36, respectively, to permit adjustment of the positions of beams 11, 12, and 13, in the direction of the axis of the tubular film.

Upper beams 11 and 12 each support a pair of spaced sleeves 14 and 15 that are secured to each of upper beams 11 and 12 and are spaced equidistantly from the center thereof. A sleeve 16 is centrally secured to the lower surface of lower beam 13. Each of sleeves 14, 15, and 16 slidably receives and supports a guide rod 17, 18, and 19, respectively. As best seen in FIG. 2, the guide rods are positioned to extend in a direction substantially parallel to each other and substantially parallel to the plane of the flattened tubular film. Each of guide rods 17, 18, and 19, carries a pair of axially spaced holders 20, 21, and 22, 23, and 24, 25, respectively. Each pair of holders rotatably supports a screw 26, 27, 28, respectively, the screws being rotatable by means of motors 26', 27', and 28', respectively, which are carried by holders 20, 22, and 25, respectively. Secured to each of sleeves 14, 15, and 16, are nuts 29, 30, and 31, which include internal threads that are adapted to engage the external threads in screws 26, 27, and 28, respectively. Each of guide rods 17, 18, and 19 is connected at an inner end thereof to an unfolding triangle 32 by means of respective articulated joints (not shown), which can be universal joints, ball joints, or the like, as will be appreciated by those skilled in the art. Thus by operation of motors 26', 27' and 28' the unfolding triangle 32 can be moved to different later positions relative to the axis of the tubular film, and also can be inclined at different angles relative to the axis of the tubular film.

As shown, unfolding triangle 32 is a solid, plate-like member and is in the form of an isosceles triangle having a pair of equal length edges that are symmetrical with respect to the axis of the tubular film and that defines a vertex adjacent edge 55 of the tubular film, and having its base positioned downstream from that vertex and substantially perpendicular to the plane of the flattened tubular film. Further, instead of a solid triangular plate, unfolding triangle 32 can be defined by a pair of inclined bars, if desired, to provide a generally wedge-shaped structure that defines a plane that is inclined with respect to the axis of the tubular film. Further, and as seen most clearly in FIGS. 3 and 5, unfolding triangle 32 includes channel members 42 and 43 that extend adjacent to and along its equal length edges, and on the underside of the triangle 32. The channel members include respective hollow conduits 42a and 43a to conduct cooling water, or the like, therethrough, which can be introduced through openings 42b and 43b provided at respective outer ends of each of the channel members 42 and 43, to cool the film and thereby prevent sticking of warm, uncooled film to the edges of the unfolding triangle.

The vertex of unfolding triangle 32 is shown in enlarged form in FIGS. 4 and 6. At its pointed end, triangle 32 includes a downward extension 37 that extends in a direction generally parallel to the axis of the tubular film. Extension 37 includes an elongated slot 37a that extends generally parallel to the plane of the flattened tubular film, and slot 37a slidably carries a narrow edge member 38 that extends through the slot, and is connected at its inner end to an inner stop 39 that is adapted to abut inner surface 39a of extension 37. Edge member 38 is movable along slot 37a and is biased in an outward direction by a spring-loaded roller 40 that bears against inner stop 39. Roller 40 is movably supported from a holder 41, that extends downwardly from the underside of unfolding triangle 32. A microswitch 60 is carried by holder 41 and is in contact with spring-loaded roller 40 to detect the position of roller 40, and consequently of edge member 38, as will hereinafter be explained.

A smoothing or deflecting roller 55' is rotatably carried in take off section 105 above unfolding triangle 32. As best seen in FIG. 1, take-off section 105 also includes take-off rollers 57 and 58, around which the film is adapted to pass after passing over smoothing roller 55'.

As earlier noted, unfolding triangle 32 is movable relative to the axis of the tubular film. In order to prevent pivotal movement of the pointed end of extension 37 of unfolding triangle 32 to such an extent that it could collide with the outermost spacing ring 47' on pinch rolls 44 and 45, the lowermost guide rod 19 carries at its innermost end adjacent unfolding triangle 32 a pair of switches 55 and 56 which close a circuit (not shown) to thereby provide a visual or audible signal when the unfolding triangle is inclined either at too great an angle or at too small an angle relative to the tubular film axis. That control arrangement also prevents contact between the extension 37 and spacing ring 47', and also contact between extension 37 and the nip defined between pinch rolls 44 and 45.

In operation, before film extrusion commences the motors 26', 27', and 28' are operated to properly position unfolding triangle 32 relative to the width of the film that is to be provided and slit. Once triangle 32 is properly positioned, the film blowing operation begins and film passes through the flattening section 100 to change the film cross section from a substantially circular one to a substantially flattened one defined by two opposite planar portions. As the film moves through the cutting and pinching section 102, cutting knife 51 provides a longitudinal slit in the film adjacent to fold line 54 to define a pair of juxtaposed film portions that are in substantially superposed relationship and are connected at opposite lateral edge 55. The spiral spring 53 acts to maintain knife 51 in engagement with fold line 54 of the film so that it does not move inwardly and thereby prevent continuous cutting from taking place.

After being cut, the film travels between the pinch rolls 44 and 45, and because the pinch rolls have a reduced diameter portion adjacent to film edge 55, there is not a sharp fold line formed at that edge, because pinching does not occur by virtue of the spacing between rolls 44 and 45 at that portion of the film, and therefore no pinch mark or fold line will be apparent in the film after it has been unfolded. After passage through the pinch rolls, the edge 55 of the film engages the edge member 38, and the position of edge member 38 is sensed by microswitch 60. When edge member 38 is moved out of a neutral position, the microswitch 60 provides a signal, and that signal can be suitably used to operate and control the operation of motors 26', 27', and 28' to move the unfolding triangle 32 either toward or away from edge 55 to maintain a desired contact pressure between edge member 38 and the film. Thus in the event of lateral wandering of the film during the operation, the unfolding triangle 32 will wander laterally in response thereto without changing its previously selected inclination.

The cut film then proceeds over the unfolding triangle 32 and around the outer equal length edges thereof in order to progressively turn each of the juxtaposed film portions in opposite directions about edge 55 until the juxtaposed film portions are substantially coplanar to provide a substantially flat web. The web then passes around smoothing roller 55' to take-off rolls 57 and 58, and to a film winder, or the like.

The limits of the inclination of the unfolding triangle 32 relative to the axis of the tubular film are defined by switches 55 and 56, which through suitable circuitry (not shown) control the operation of motors 26', 27', and 28' in order to properly incline the unfolding triangle 32.

Thus it can be seen that the present apparatus provides an improved flattening and take-off apparatus for a tubular film web to provide a flat, single ply web that has substantially parallel side edges and that does not exhibit pinch marks or fold line marks in the center portion thereof.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A flattening and take-off apparatus for a tubular plastic film extruded from a stationary film extrusion head, said apparatus comprising:
   (a) flattening means positioned downstream of the film extrusion head for flattening a tubular film;
   (b) a pair of rotatable pinch rolls positioned downstream of said flattening means and having their axes in parallel relationship for receiving flattened tubular film therebetween;
   (c) cutting means positioned between said pinch rollers and said flattening means for longitudinally cutting said flattened film along one lateral edge thereof to define a pair of juxtaposed film portions connected at an opposite lateral edge of said flattened tubular film;
   (d) unfolding means positioned downstream of said pinch rollers for receiving said cut flattened film and for progressively turning each of said juxtaposed film portions in opposite directions about said opposite lateral edge until the juxtaposed film portions are substantially coplanar to provide a substantially flat web, said unfolding means including an edge contact member in contact with said opposite lateral edge of said film, and outwardly diverging elongated edge members about which respective ones of said juxtaposed film portions are adapted to pass; and
   (e) adjusting means for adjusting the position of said unfolding means relative to the axis of said tubular film.

2. Apparatus according to claim 1, wherein at least one of the pinch rolls has a reduced diameter portion adjacent the opposite lateral edge of the film so that the opposite lateral edge moves between the pinch rolls in a substantially uncompressed condition.

3. Apparatus according to claim 2, including removable shell rings adapted to be fitted on and secured to said at least one roll wherein the axial length of the reduced diameter portion of said at least one pinch roll can be changed by adding and subtracting shell rings.

4. Apparatus according to claim 1, wherein said elongated edge members of the unfolding means include passageways for conducting a cooling fluid.

5. Apparatus according to claim 1, wherein said unfolding means includes at least three axially adjustable adjusting rods that extend in two parallel and substantially horizontal planes transverse to the axis of the tubular film, said adjusting rods being pivotally connected with the unfolding means and displaceable in unison and separately to adjust the position of the unfolding means relative to the axis of the tubular film.

6. Apparatus according to claim 5, wherein said adjusting rods are carried in a supporting frame, and adjustment means are provided for adjusting the position of said supporting frame along a line substantially parallel to the axis of the tubular film.

7. Apparatus according to claim 1, wherein said cutting means includes a knife carried in a knife holder movably mounted on a carriage, said carriage being laterally displaceable relative to the axis of the tubular film and spaced from and substantially parallel to a nip defined by the pinch rolls.

8. Apparatus according to claim 7, wherein said cutting means includes spring means for urging the knife toward a cutting position for cutting the tubular film.

9. Apparatus according to claim 1, wherein said edge contact member is rounded for engagement with the tubular film and is adapted to be biased into a neutral position by biasing means.

10. Apparatus according to claim 1, wherein said edge contact member is movable inwardly toward and outwardly from the axis of the tubular film by said opposite lateral edge of the film, and said apparatus includes switch means for sensing the position of the unfolding means and for controlling the horizontal movement of the unfolding means relative to the axis of the tubular film without changing its inclination relative to the axis of the tubular film.

11. Apparatus according to claim 1, wherein said pinch rolls include driving means for rotating said pinch rolls to thereby minimize the tension imparted to said tubular film by said apparatus.

* * * * *